United States Patent
Mouri et al.

(10) Patent No.: US 7,327,658 B2
(45) Date of Patent: Feb. 5, 2008

(54) WOBBLE SIGNAL PROCESSING APPARATUS

(75) Inventors: Hiroki Mouri, Hirakata (JP); Kouji Okamoto, Ikeda (JP); Youichi Ogura, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 460 days.

(21) Appl. No.: 10/722,397

(22) Filed: Nov. 28, 2003

(65) Prior Publication Data

US 2004/0136300 A1 Jul. 15, 2004

(30) Foreign Application Priority Data

Nov. 29, 2002 (JP) ............................. 2002-348374

(51) Int. Cl.
*G11B 7/00* (2006.01)
(52) U.S. Cl. .................................. 369/53.33; 369/47.22
(58) Field of Classification Search ............ 369/47.27, 369/53.33, 44.22
See application file for complete search history.

(56) References Cited

U.S. PATENT DOCUMENTS

| | | | |
|---|---|---|---|
| 6,167,415 A * | 12/2000 | Fischer et al. .............. | 708/320 |
| 6,181,177 B1 * | 1/2001 | Chapman .................... | 327/172 |
| 6,345,024 B2 | 2/2002 | Sugasawa et al. | |
| 6,377,525 B1 * | 4/2002 | Iida .......................... | 369/47.17 |
| 6,483,787 B1 | 11/2002 | Sugasawa et al. | |
| 6,621,772 B2 * | 9/2003 | Asano et al. ............. | 369/44.26 |
| 6,701,335 B2 * | 3/2004 | Pupalaikis ................. | 708/300 |
| 2001/0000694 A1 | 5/2001 | Sugasawa et al. | |

FOREIGN PATENT DOCUMENTS

| | | |
|---|---|---|
| EP | 0938084 A2 | 8/1999 |
| EP | 0938084 A3 | 2/2000 |
| JP | 62154886 A | 7/1987 |
| JP | 11-238245 | 8/1999 |

OTHER PUBLICATIONS

"Digital Signal Processing", Shigeo Tsujii, published by Shokodo, Apr. 1990; pp. 66-77.

* cited by examiner

*Primary Examiner*—Wayne Young
*Assistant Examiner*—Adam R. Giesy
(74) *Attorney, Agent, or Firm*—Wenderoth, Lind & Ponack, L.L.P.

(57) ABSTRACT

The present invention is made to improve the conventional analog processing that is easily affected by variations in semiconductor processing. This invention provides a wobble signal processing apparatus that can reduce the circuit scale and the power consumption as well as improve the quality of signal processing. The wobble signal processing apparatus of the present invention digitally processes a part that has conventionally been processed by an analog system, and a PRML circuit is further provided to implement error detection, whereby the circuit scale and the power consumption is reduced. This improves the detection of a signal that is inputted to the wobble signal processing apparatus.

16 Claims, 11 Drawing Sheets

WOBBLE SIGNAL PROCESSING APPARATUS

FIELD OF THE INVENTION

The present invention relates to a signal processing system in the technology of digital signal processing for optical discs (recording media).

BACKGROUND OF THE INVENTION

In conventional wobble signal processing apparatus, means for processing signals by an analog system are utilized (see, for example, Japanese Examined Patent Publication No. Hei.6-19898). As methods for phase-modulating wobbles on tracks by these conventional wobble signal processing apparatus, methods such as BPSK, DPSK, and QPSK have been proposed.

However, the analog processing of the conventional wobble signal processing apparatus is easily affected by processing variations in the semiconductor processing and, for example, the resistance or capacitance value may deviate from a set value by several to a dozen or more percent. In addition, deviation of a supply voltage value in the power supply unit may cause a fatal problem in the analog system that requires a fine set value. For example, when a filter parameter such as the cutoff frequency of a BPF (Band pass filter) or LPF (Low pass filter) deviates, the filter characteristics are deteriorated. When the power supply value of an analog unit cannot obtain a set value with stability, the supply voltage characteristics vary, and then the filter characteristics are deteriorated. Further, as the delay amount varies in the analog system, a circuit for phase compensation is required, thereby adversely increasing the circuit scale and the power consumption.

SUMMARY OF THE INVENTION

Accordingly, an object of the present invention is to provide a wobble signal processing apparatus that can reduce the circuit scale and the power consumption, and improve the quality of signal processing.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a first aspect of the present invention, there is provided a wobble signal processing apparatus comprising: a pickup for reading information recorded on an optical disc medium on/from which data can be recorded/reproduced; a WBL (wobble) binarization circuit for smoothing edges of a wobble binary signal that is read by the pickup; a FEP (Front End Processor) for performing band limitation and gain control to a wobble signal that is read by the pickup; an ADC (Analog-to-Digital Converter) for converting the wobble signal outputted from the FEP into a digital signal; an address detection circuit for detecting an ADIP (Address In Pre-Groove) signal as address information of the data on the basis of the digital signal outputted from the ADC; a waveform shaping circuit for generating a wobble binary signal waveform on the basis of a RF signal that is read by the pickup; a phase control circuit for controlling the phase of the wobble binary signal outputted from the WBL binarization circuit with reference to the wobble binary signal waveform generated by the waveform shaping circuit; and a PLL (Phase Locked Loop) circuit, which is connected to the phase control circuit, for generating a sync clock on the basis of the phase controlled data. According to the first aspect, the address detection circuit and the waveform shaping circuit being digitally configured. Therefore, the apparatus can be constructed in a smaller circuit scale relative to the conventional apparatus, whereby the power consumption can be suppressed. Further, detection and correction of the phase shift can be performed properly, thereby improving the quality of signal processing.

According to a second aspect of the present invention, in accordance with the wobble signal processing apparatus of the first aspect, the waveform shaping circuit includes a BPF (Band Pass Filter) as a digital filter, and the digital filter is constituted by an IIR (Infinity Impulse Response) digital filter having a reset function of initializing the digital filter when the digital filter characteristics are divergent. Therefore, even when the output value of the digital filter diverges, the digital filter can be initialized, thereby to stabilize the system.

According to a third aspect of the present invention, in accordance with the wobble signal processing apparatus of the first aspect, the address detection circuit includes a LPF (Low Pass Filter) as a digital filter, and the digital filter is constituted by an IIR digital filter having a reset function of initializing the digital filter when the digital filter characteristics are divergent.

According to a fourth aspect of the present invention, in accordance with the wobble signal processing apparatus of the second or third aspect, the digital filter calculates an optimum tap coefficient value, stores the optimum tap coefficient value in a storage unit that is externally provided, and performs filtering by utilizing the optimum tap coefficient value stored in the storage unit. Therefore, it is unnecessary to calculate the optimum tap coefficient value each time, whereby the operation time can be reduced and the filtering can be performed effectively.

According to a fifth aspect of the present invention, in accordance with the wobble signal processing apparatus of the first aspect, the address detection circuit comprises: a digital filter for filtering the output from the ADC; and a PRML (Partial Response Maximum Likelihood) circuit for correcting errors in the signal outputted from the digital filter, and detecting the ADIP signal by using the corrected signal. Therefore, even when any problem arises for some reason such as noises or phase delay, the ADIP signal can be accurately detected.

According to a sixth aspect of the present invention, in accordance with the wobble signal processing apparatus of the fifth aspect, a PRML system that is implemented by the PRML circuit is a PR(a,b) system, where a and b are integers.

According to a seventh aspect of the present invention, in accordance with the wobble signal processing apparatus of the sixth aspect, parameter values in the PR(a,b) system have a relationship of a=b.

According to an eighth aspect of the present invention, in accordance with the wobble signal processing apparatus of the fifth aspect, the PRML circuit switches a sampling method between a peak sampling method and an offset sampling method.

According to a ninth aspect of the present invention, in accordance with the wobble signal processing apparatus of the eighth aspect, the PRML circuit performs the sampling in a cycle of 8T.

According to a tenth aspect of the present invention, in accordance with the wobble signal processing apparatus of the fifth aspect, the PRML circuit performs a standardized Euclidean distance algorithm in a computing circuit of a Viterbi decoder by the PRML system.

According to an eleventh aspect of the present invention, in accordance with the wobble signal processing apparatus of the first aspect, the address detection circuit comprises: a first digital filter for filtering the output from the ADC; a phase control circuit for controlling the phase of the wobble binary signal outputted from the WBL binarization circuit with reference to the signal outputted from the first digital filter, and outputting a phase controlled signal; a multiplier for multiplying the signal outputted from the first digital filter by the phase controlled signal; a second digital filter for filtering an output from the multiplier; an edge smoothing circuit for binarizing the signal outputted from the first digital filter, and smoothing edges of the binarized signal, so as to generate a clock for outputting the ADIP signal; and a binarization circuit for binarizing the signal outputted from the second digital filter in accordance with the clock that is outputted from the edge smoothing circuit, and outputting the ADIP signal.

According to a twelfth aspect of the present invention, in accordance with the wobble signal processing apparatus of the first or eleventh aspect, the phase control circuit obtains a phase difference between the wobble binary signal and the wobble signal that has passed through the digital filter, and controls the phase by delaying the wobble binary signal.

According to a thirteenth aspect of the present invention, in accordance with the wobble signal processing apparatus of the twelfth aspect, the phase control circuit corrects a phase shift by performing counter processing to clock delay information previously obtained.

According to a fourteenth aspect of the present invention, in accordance with the wobble signal processing apparatus of the first aspect, the address detection circuit comprises: a digital filter for filtering the output from the ADC; and a DSV (Digital Sum Value) calculator for digitally processing the output from the digital filter by dividing the output from the digital filter with a predetermined threshold value, thereby detecting the ADIP signal.

According to a fifteenth aspect of the present invention, in accordance with the wobble signal processing apparatus of the first aspect, the address detection circuit comprises: a digital filter for filtering the output from the ADC; a binarization circuit for binarizing the output from the digital filter; and a counter circuit for counting the number of +1 and the number −1 in the signal outputted from the binarization circuit, and the ADIP signal is detected on the basis of the count values of the counter circuit.

According to a sixteenth aspect of the present invention, in accordance with the wobble signal processing apparatus of the first aspect, the ADC has a 7-bit resolution.

According to a seventeenth aspect of the present invention, in accordance with the wobble signal processing apparatus of the first aspect, the FEP further includes an AGC (Auto Gain Control) circuit for performing automatic amplitude control when the amplitude of the ADIP section is decreased or increased due to crosstalk in the optical disc medium. Thereby, the system can be operated with stability.

According to an eighteenth aspect of the present invention, in accordance with the wobble signal processing apparatus of the first aspect, the pickup further includes an aperture ratio decision unit for deciding the degree of distortion of the waveform that is read from the optical disc medium, and controlling the diameter 6f a beam spot of a pickup laser on the basis of the decided degree of distortion of the waveform, thereby controlling the degree of signal component extraction. Thereby, the system can be operated with stability.

According to a nineteenth aspect of the present invention, in accordance with the wobble signal processing apparatus of the first aspect, the wobble signal processing apparatus operates in accordance with the sync clock that is supplied from the PLL circuit, and the sync clock is adaptively changed according to an angular velocity of the optical disc medium.

DETAILED DESCRIPTION OF THE PREFERRED EMBODIMENTS

Hereinafter, embodiments of the present invention will be described with reference to the drawings. The embodiments shown herein are exemplary only, and the invention is not limited to these embodiments.

First Embodiment

Figure 1:
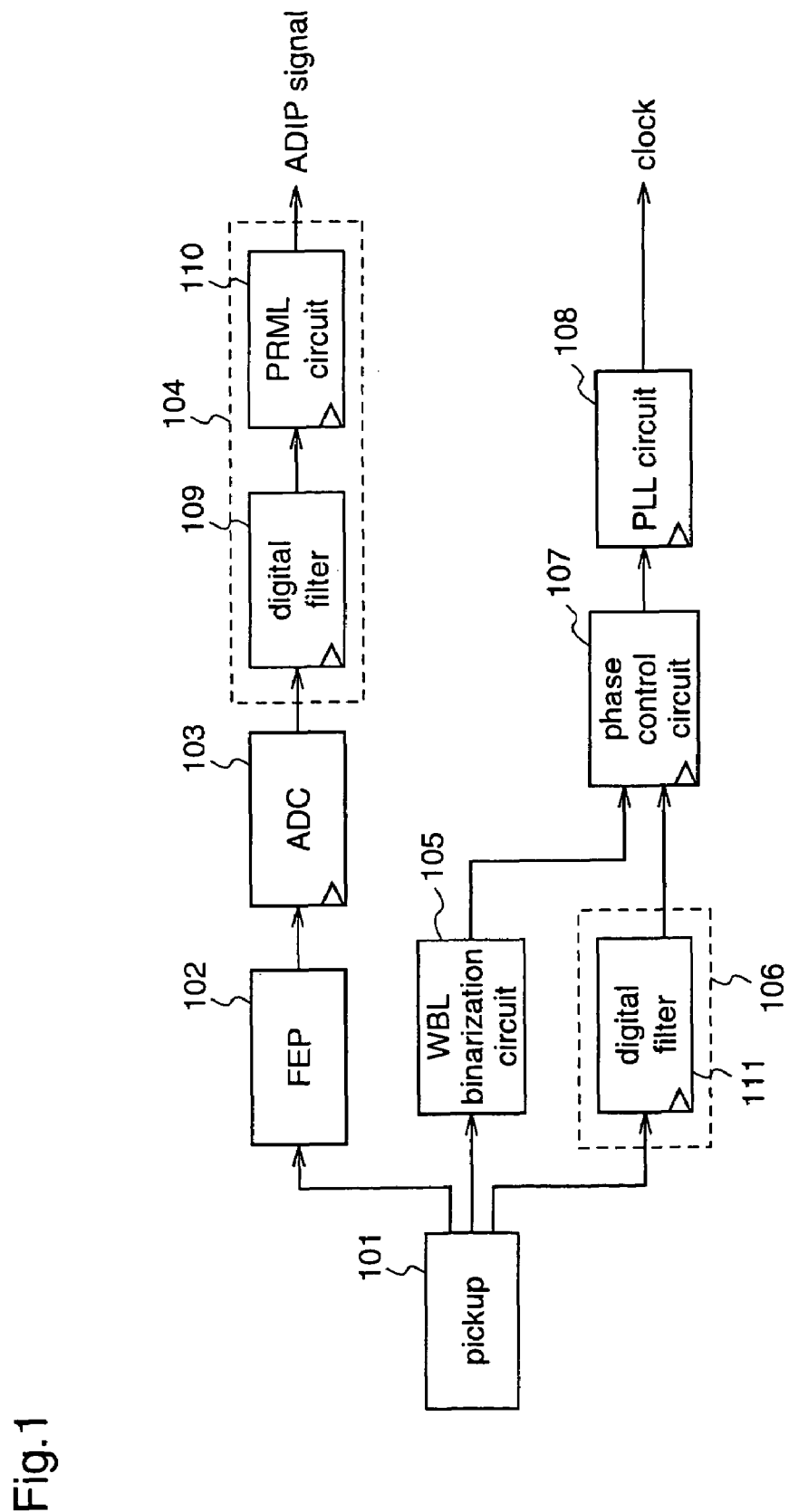
FIG. 1 is a block diagram illustrating a construction of a wobble signal processing apparatus according to a first embodiment of the present invention.

A wobble signal processing apparatus according to a first embodiment of the present invention will now be described. FIG. 1 is a block diagram illustrating a construction of the wobble signal processing apparatus according to the first embodiment. In FIG. 1, the wobble signal processing apparatus according to the first embodiment is constituted by a pickup 101, a FEP (Front End Processor) 102, an ADC (Analog-to-Digital Converter) 103, an address detection circuit 104, a WBL binarization circuit 105, a waveform shaping circuit 106, a phase control circuit 107, and a PLL (Phase Locked Loop) circuit 108.

Figure 7:
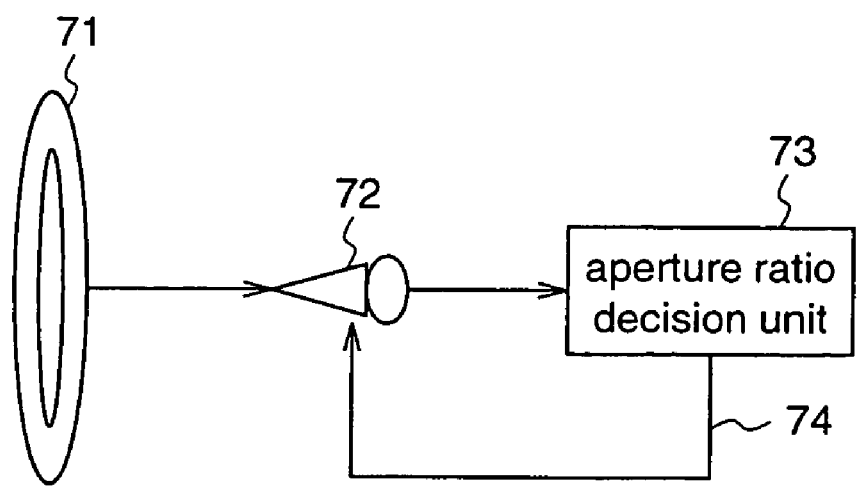
FIG. 7 is a diagram illustrating a construction of a pickup according to the present invention.

The pickup 101 outputs a wobble signal (hereinafter, referred to as a WBL signal) read from a recording medium to the FEP 102, outputs a wobble binary signal (hereinafter, referred to as a WBL binary signal) to the WBL binarization circuit 105, and outputs a RF signal to the waveform shaping circuit 106, respectively. The pickup 101 may include an aperture ratio decision unit 73 for deciding the degree of distortion of the waveform that is read from an optical disc medium 71, as shown in FIG. 7. With the pickup 101 having the aperture ratio decision unit 73 shown in FIG. 7, when the output waveform is distorted and is hard to read, the spot diameter of a pickup laser 72 is adjusted in accordance with a control signal 74 that is outputted from the aperture ratio decision unit 73, thereby adjusting the signal component extraction degree.

The FEP 102 performs band limitation and gain control to the inputted WBL signal. It is assumed here that the FEP 102 includes an AGC (Auto Gain Control) that performs an automatic amplitude control when the amplitude of an ADIP (Address In Pre-Groove) section is decreased or increased due to crosstalk in the recording medium.

The ADC 103 converts the analog signal outputted from the FEP 102 to a digital signal. It is assumed here that the bit resolution is 7 bits.

The address detection circuit 1041s constituted by a digital filter 109 and a PRML (Partial Response Maximum Likelihood) circuit 110. This address detection circuit 104 receives the digital signal outputted from the ADC 103, and processes the digital signal by a digital system to detect an ADIP signal. It is assumed here that the digital filter 109 is a LPF (Low pass filter) that implements an IIR (Infinity Impulse Response) digital system.

The WBL binarization circuit 105 smoothes edges of the WBL binary signal outputted from the pickup 101.

The waveform shaping circuit 106 is constituted by a digital filter 111. The waveform shaping circuit 106 receives the RF signal read by the pickup 101 and performs digital signal processing to generate a WBL binary signal waveform. The digital filter 111 herein is a BPF (Band pass filter) that implements the IIR digital system.

The phase control circuit 107 controls the phase of the WBL binary signal outputted from the WBL binarization circuit 105 with reference to the WBL binary signal waveform outputted from the waveform shaping circuit 106, and outputs a phase control signal.

The PLL (Phase Locked Loop) circuit 108 generates a sync clock on the basis of the phase control signal that is outputted from the phase control circuit 107.

Next, the operation of the wobble signal processing apparatus according to the first embodiment will be described. Here, the wobble signal processing apparatus according to the first embodiment operates in accordance with the sync clock that is inputted from the PLL circuit 10B to the respective circuits, and the sync clock is adaptively changed according to the angular velocity of the disc. Clocks such as WBLPLLOK, WCLK, CLKTCH, CLKSYS are employed as the sync clock.

Initially, an ADIP signal detection process performed by the FEP 102, the ADC 103, and the address detection circuit 104 in the wobble signal processing apparatus according to the first embodiment will be described.

When the FEP 102 receives a WBL signal inputted from the pickup 101, the FEP 102 performs band limitation and gain control to the inputted WBL signal, and outputs the resultant signal to the ADC 103. When the amplitude of an ADIP (Address In Pre-Groove) section is decreased or increased due to crosstalk in the recording medium, the AGC in the FEP 102 performs an automatic amplitude control to realize stable signal outputting.

When the ADC 103 receives the WBL signal outputted from the FEP 102, the ADC 103 converts the analog WBL signal to a digital signal.

The WBL signal that has been converted to the digital signal by the ADC 103 is inputted to the address detection circuit 104, and then the address detection circuit 104 performs digital signal processing to detect an ADIP signal.

Hereinafter, the operation of the address detection circuit 104 will be described in more detail.

Figure 2:
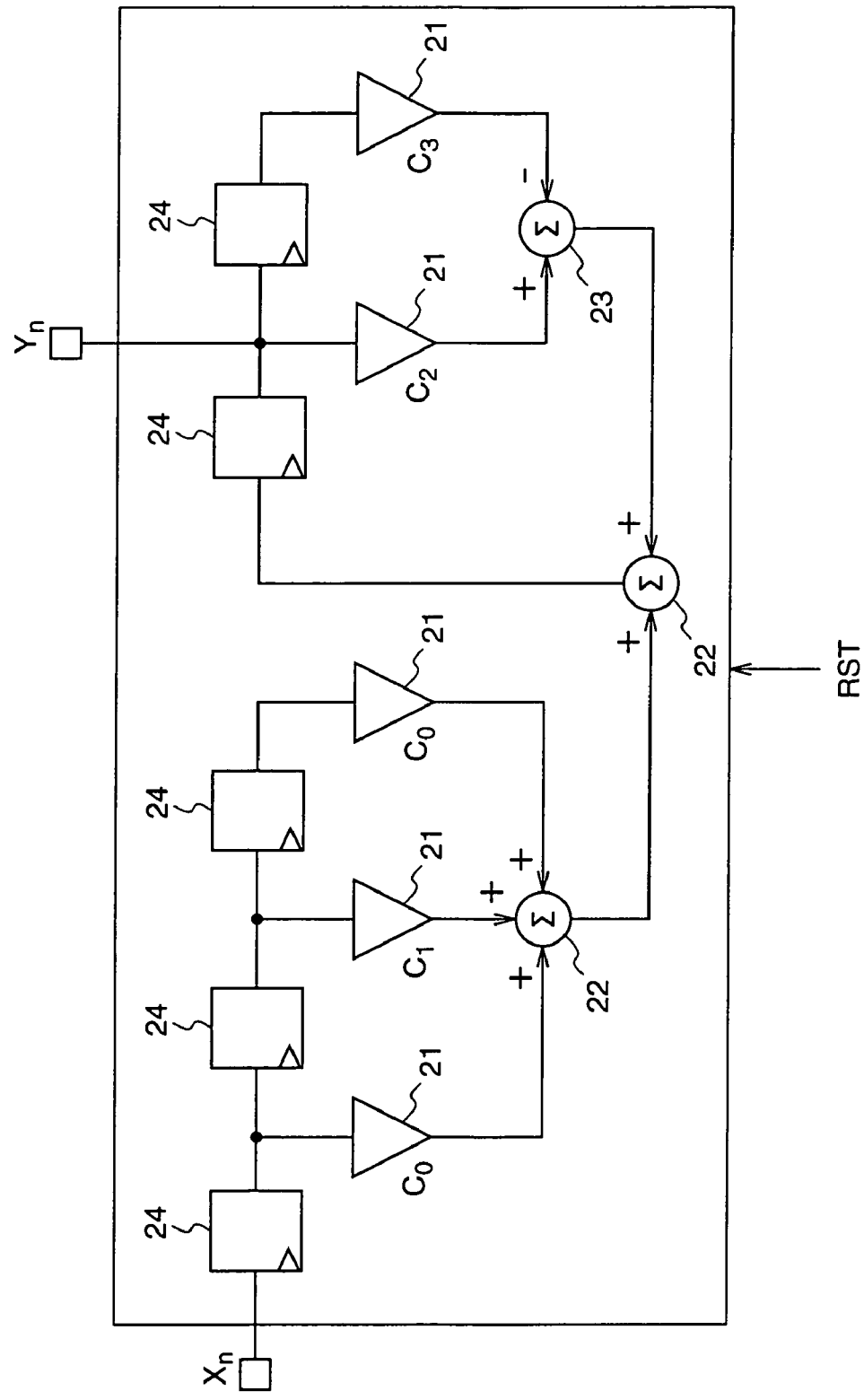
FIG. 2 is a diagram illustrating a construction of a bilinear transformation LPF, which constitutes an address detection circuit according to the present invention.
Figure 3:
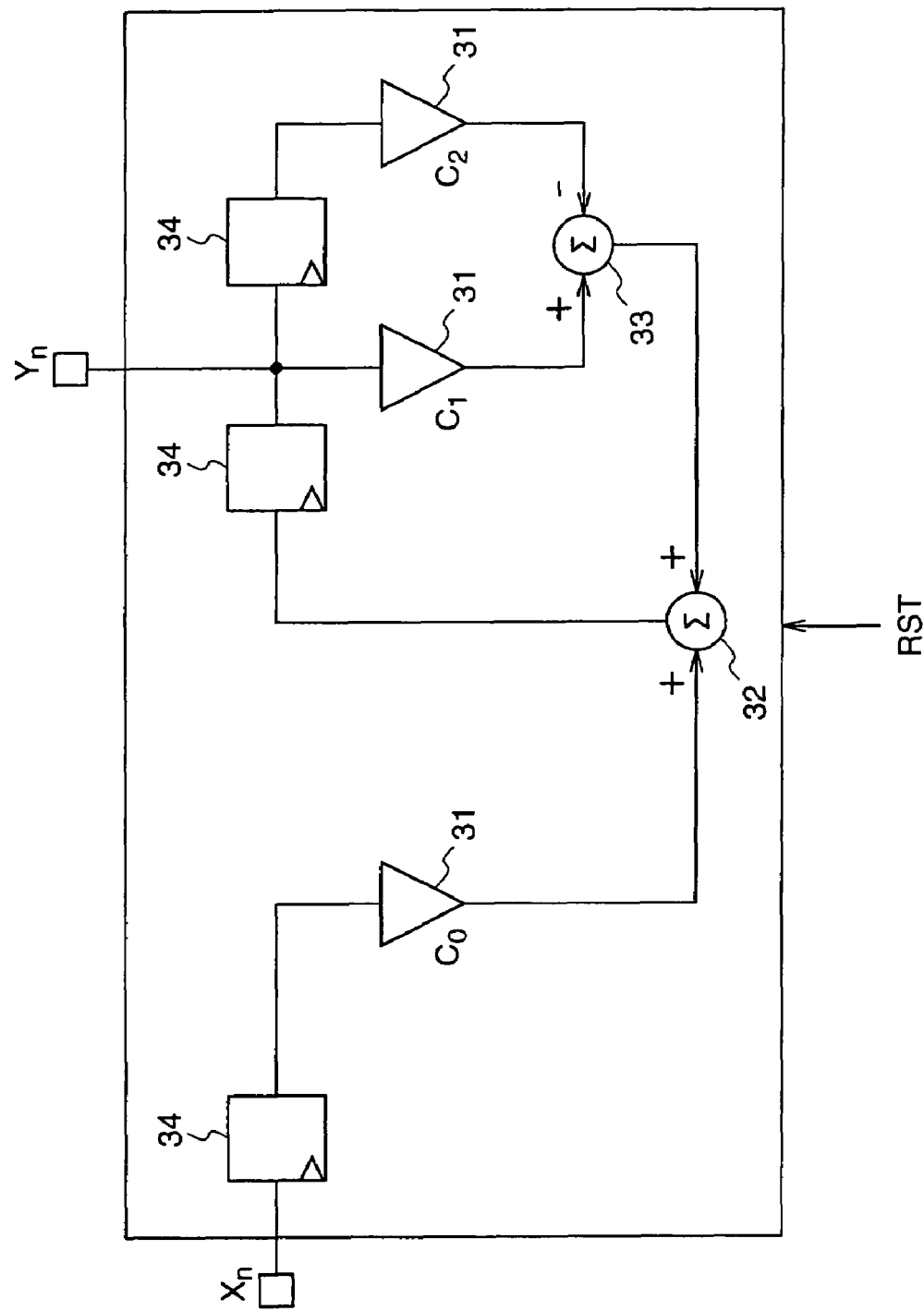
FIG. 3 is a diagram illustrating a construction of a backward difference LPF, which constitutes the address detection circuit according to the present invention.

Initially, the digital filter 109 of the address detection circuit 104 will be described with reference to FIGS. 2 and 3. The digital filter shown in FIGS. 2 and 3 is a LPF that implements the IIR digital system. FIGS. 2 and 3 each show an example of the construction of the digital filter 109 according to the first embodiment. When the digital filter 109 is to be mounted, either of the digital filters shown in FIGS. 2 and 3 may be employed to construct the digital filter 109.

FIG. 2 is a diagram illustrating a construction of the digital filter 109 as a component of the address detection circuit according to the present invention.

The IIR digital LPF as shown in FIG. 2 comprises coefficient units (multipliers) 21, adders 22, a subtractor 23, and registers 24. The IIR digital LPF is constituted by multiplication between input data and a tap coefficient value, and the IIR digital LPF performs an arithmetic operation according to a bilinear transformation method. Here, the tap coefficient in the digital filter 109 is automatically calculated, for example, by optimization based on a LMS method (least mean square method). When the automatically calculated tap coefficient is stored in a storage unit that is externally provided and the following filtering is performed by utilizing the tap coefficient that is stored in the storage unit, there is no need to calculate the optimum tap coefficient each time, whereby the operation time can be reduced and the filtering can be performed efficiently.

In FIG. 2, $X_n$ denotes an input signal and $Y_n$ denotes an output signal. When the input signal is $X_n$ and the output signal is $Y_n$, the transfer function $H(s)$ and the output signal $Y_n$ are represented by [Formula 1].

$$H(s) = \frac{\omega_0^2}{s^2 + \frac{\omega_0}{Q}s + \omega_0^2} \quad [\text{Formula 1}]$$

$$\left(\text{where } \frac{\omega_0}{Q} = \frac{2\pi f_c}{q_1}, S = \frac{2}{T} \times \frac{1-D}{1+D}\right)$$

$$Y_n = \frac{1}{c}\{\omega_0^2 X_n + 2\omega_0^2 X_{n-1} + \omega_0^2 X_{n-2} + BY_{n-1} - AY_{n-2}\}$$

$$\left(\text{where } A = \frac{4}{T^2} - \frac{2\omega_o}{q_1 T} + \omega_0^2, B = \frac{8}{T^2} - 2\omega_0^2,\right.$$

$$\left. C = \frac{4}{T^2} + \frac{2\omega_0}{q_1 T} + \omega_0^2, \omega_0 = 2\pi f_c\right)$$

where $f_c$ is the cutoff frequency, $q_1$ is the cutoff characteristics value, and T is the operation frequency (channel rate).

Further, RST in FIG. 2 denotes are set signal that is inputted to the digital filter 109 from the outside, and this reset signal implements a reset function for initializing the digital filter 109. This reset function is provided because the IIR filter has filtering characteristics that may be divergent, as shown in a reference document "Digital signal processing" (written by Shigeo Tsujii, SHOKODO, pp. 66-77). When the output value of the digital filter 109 diverges, the digital filter 109 is reset by the reset signal, thereby to stabilize the system.

FIG. 3 is a diagram illustrating a construction of the digital filter 109 as a component of the address detection circuit according to the present invention.

The IIR digital LPF as shown in FIG. 3 comprises coefficient units (multipliers) 31, an adder 32, a subtractor 33, and registers 34. This IIR digital LPF is constituted by multiplication between input data and a tap coefficient value, and performs an arithmetic operation according to a backward difference method. The tap coefficient value in the digital filter 109 is automatically calculated, for example, by the optimization based on the LMS method (least mean square method). When the automatically calculated tap coefficient is stored in a storage unit that is externally provided and the following filtering is performed by utilizing the tap coefficient stored in the storage unit, there is no need to calculate the optimum tap coefficient each time, whereby the operation time can be reduced and the filtering can be performed efficiently.

In FIG. 3, $X_n$ denotes an input signal, and $Y_n$ denotes an output signal. When the input signal is $X_n$ and the output signal is $Y_n$, the transfer function H(s) and the output signal $Y_n$ is represented by the following [Formula 2].

$$H(s) = \frac{\omega_0^2}{S^2 + \frac{\omega_0}{Q}S + \omega_0^2} \left(\text{where } \frac{\omega_0}{Q} = \frac{2\pi f_c}{q_1}, S = \frac{1-D}{T}\right) \quad \text{[Formula 2]}$$

$$Y_n = \frac{B}{A}X_n + \frac{C}{A}Y_{n-1} - \frac{1}{A}Y_{n-2}$$

$$\left(\text{where } A = 1 + \frac{\omega_0 T}{q_1} + \omega_0^2 T^2,\right.$$

$$\left. B = \omega_0^2 T^2, C = 2 + \frac{\omega_0 T}{q_1}, \omega_0 = 2\pi f_c\right)$$

where $f_c$ is the cutoff frequency, $q_1$ is the cutoff characteristics value, and T is the operation frequency (channel rate).

Further, similar to FIG. 2, RST in FIG. 3 denotes a reset signal that is inputted to the digital filter 109 from the outside, and this reset signal implements a reset function for initializing the digital filter 109. The reset function is provided because the IIR filter has filtering characteristics that may be divergent, as shown in the reference document "Digital signal processing" (written by Shigeo Tsujii, SHOKODO). When the output value of the digital filter diverges, the digital filter 109 can be initialized by the reset signal, thereby to stabilize the system.

Figure 4:
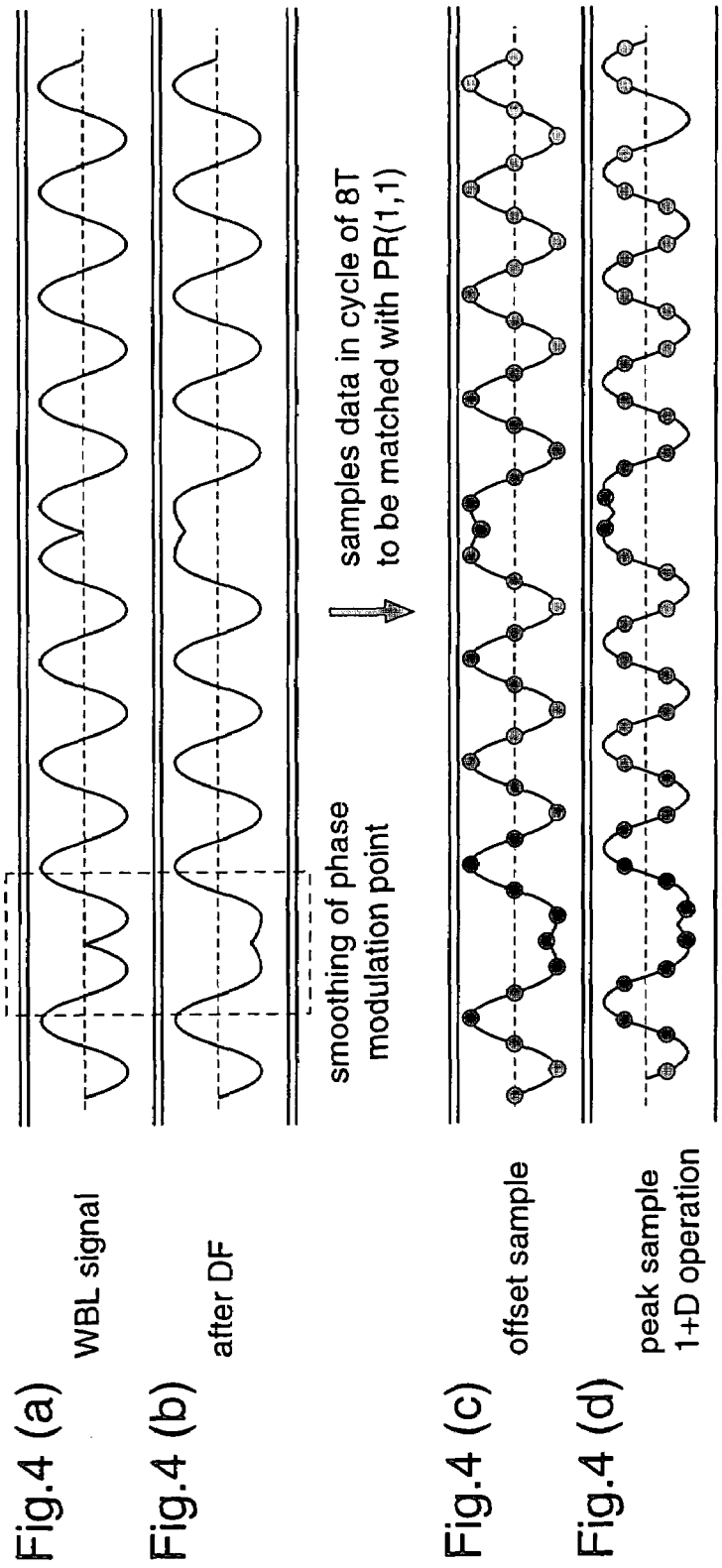
FIGS. 4(a) to 4(d) are waveform diagrams for explaining an ADIP signal detection process performed by the wobble signal processing apparatus according to the first embodiment.

Next, the PRML circuit 110 as a component of the address detection circuit 104 will be described, with reference to FIG. 4.

FIGS. 4(a) to 4(d) are waveform diagrams for explaining the ADIP detection process in the wobble signal processing apparatus according to the first embodiment. FIG. 4(a) shows a WBL signal that is inputted to the digital filter 109. FIG. 4(b) shows a signal outputted from the digital filter 109 (after DF). FIG. 4(c) shows offset samples that are obtained by offset sampling by the PRML circuit 110. FIG. 4(d) shows peak samples that are obtained by peak sampling by the PRML circuit 110.

The PRML circuit 110 corrects errors in the output signal from the digital filter 109, and detects an ADIP signal using the corrected signal. As shown in FIGS. 4(a) to 4(d), smoothing of phase demodulation points and noise removal is performed by the digital filter 109, and the signal outputted from the digital filter 109 is sampled in a cycle of 8T, so as to be matched with the PR(1,1) system. In this case, the sampling method is switched between the peak sampling method and the offset sampling method.

Then, the sample points that are sampled so as to be matched with the PR(1,1) system are decoded by a viterbi decoder to perform error correction. Even when any problem arises for some reason such as noises or phase delay, this error correction implements an accurate ADIP detection. In the ADIP detection process, 4T consecutive sample points among the corrected values are considered as an ADIP section.

The PRML circuit 110 in the wobble signal processing apparatus according to the first embodiment samples data in the cycle of 8T, to perform the error correction by the PR(1,1) system. However, when the PR coefficient is properly set, such as in a case where the error correction is performed by a PR(a,b) system in which the relationship between "a" and "b" is a=b, the above-mentioned effect can be obtained.

Next, the clock generation process performed by the WBL binarization circuit 105, the waveform shaping circuit 106, the phase control circuit 107, and the PLL circuit 108 in the wobble signal processing apparatus according to the first embodiment will be described.

The WBL binarization circuit 105 smoothes edges of the WBL binary signal that is outputted from the pickup 101, and outputs the smoothed WBL binary signal to the phase control circuit 107. The digital filter 111 that constitutes the wave form shaping circuit 106 receives a RF signal that is read by the pickup 101, then digitally processes the input signal to generate a WBL binary signal waveform, and outputs the generated WBL binary signal waveform to the phase control circuit 107.

Then, the smoothed WBL binary signal outputted from the WBL binarization circuit 105 and the WBL binary signal waveform outputted from the waveform shaping circuit 106 are inputted to the phase control circuit 107. The phase control circuit 107 controls the phase of the smoothed WBL binary signal outputted from the WBL binarization circuit 105 with reference to the WBL binary signal waveform outputted from the waveform shaping circuit 106, and outputs the phase controlled signal to the PLL circuit 108.

The PLL circuit 108 receives the phase controlled signal outputted from the phase control circuit 107, and generates a sync clock that is synchronized with this phase controlled signal.

Hereinafter, the construction of the digital filter 111 that constitutes the waveform shaping circuit 106 will be described in more detail with reference to FIG. 5.

Figure 5:
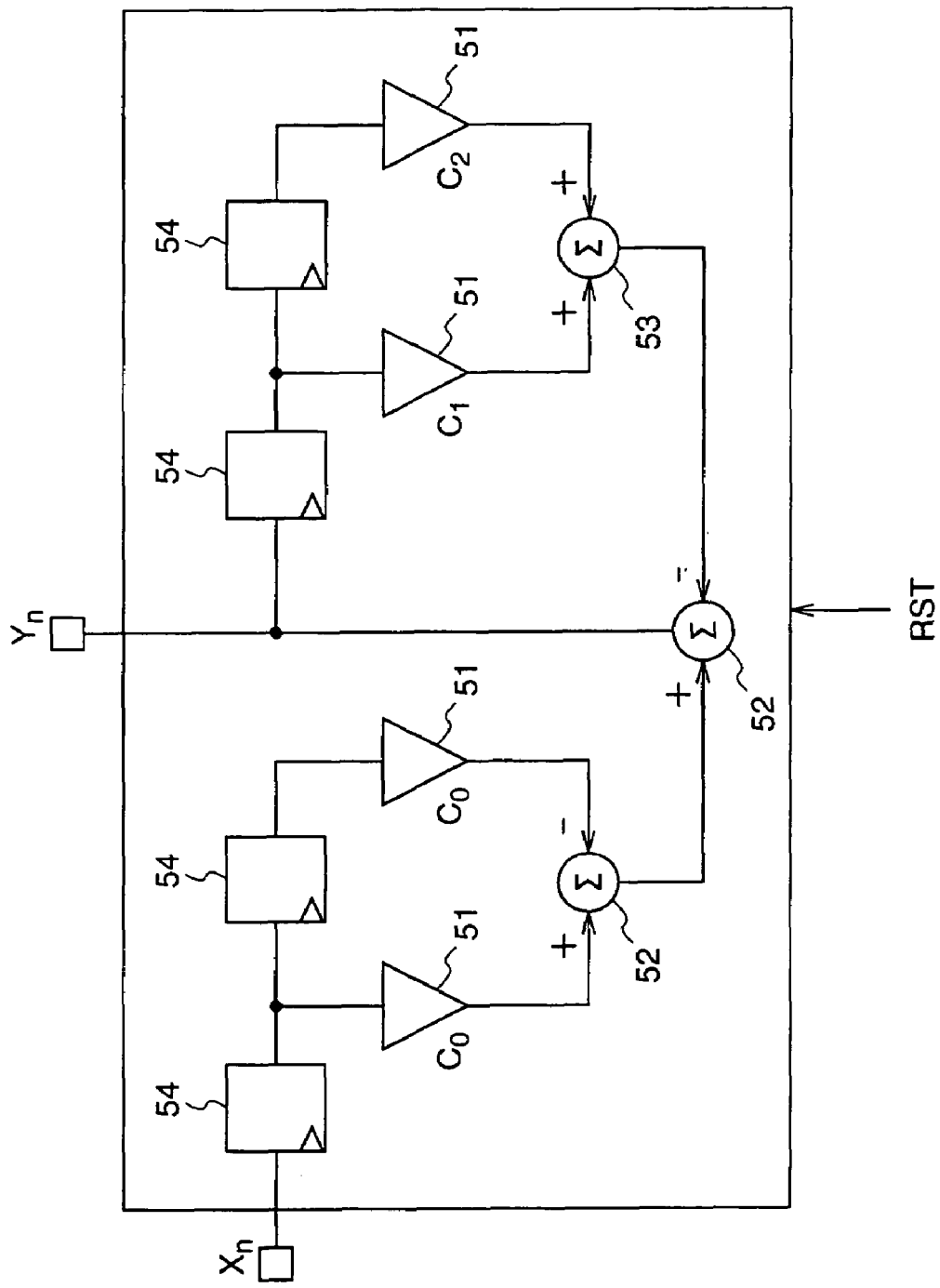
FIG. 5 is a diagram illustrating a construction of a BPF, which constitutes a waveform shaping circuit according to the present invention.

FIG. 5 is a diagram illustrating a construction of the digital filter 111 that constitutes the waveform shaping circuit according to the present invention.

The BPF that implements the IIR digital system as shown in FIG. 5 comprises coefficient units (multipliers) 51, adders 52, a subtractor 53, and registers 54. The IIR digital system BPF is constituted by multiplication between input data and a tap coefficient value, and the IIR digital system performs an arithmetic operation by the bilinear transformation method. The tap coefficient in this digital filter 109 is automatically calculated, for example, by optimization according to the LMS method (least mean square method). When the automatically calculated tap coefficient is stored in a storage unit that is externally provided and the following filtering is performed by utilizing the tap coefficient stored in the storage unit, there is no need to calculate the optimum tap coefficient each time, whereby the operation time can be reduced and the filtering can be performed effectively.

In FIG. 5, $X_n$ denotes an input signal and $Y_n$ denotes an output signal. When the input signal is $X_n$ and the output signal is $Y_n$, the transfer function H(s) and the output signal $Y_n$ are represented by following [Formula 3].

$$H(s) = \frac{\frac{\omega_0}{Q}S}{S^2 + \frac{\omega_0}{Q}S + \omega_0^2}$$ [Formula 3]

$$\left(\text{where } \frac{\omega_0}{Q} = \frac{2\pi f_c}{q_1}, S = \frac{2}{T} \times \frac{1-D}{1+D}\right)$$

$$Y_n = \frac{B}{A^2 + B + C}X_n - \frac{B}{A^2 + B + C}X_{n-2} - \frac{2(A^2 - C)}{A^2 + B + C}Y_{n-1} - \frac{A^2 - B + C}{A^2 + B + C}Y_{n-2}$$

$$\left(\text{where } A = 2\pi f_c, B = \frac{2A}{q_1 T}, C = \frac{4}{T^2}\right)$$

where $f_c$ is the cutoff frequency, $q_1$ is the cutoff characteristics value, and T is the operation frequency (channel rate).

Further, RST in FIG. 5 denotes are set signal that is inputted to the digital filter 111 from the outside, and this reset signal implements a reset function of initializing the digital filter 111. This reset function is provided because the IIR filter has filtering characteristics that may be divergent, as shown in the reference document "Digital signal processing" (written by Shigeo Tsujii, SHOKODO) When the output value of the digital filter 111 diverges, the digital filter 111 is initialized by the reset signal, thereby to stabilize the system.

Next, the construction of the phase control circuit 107 will be described in more detail with reference to FIG. 6.

Figure 6:
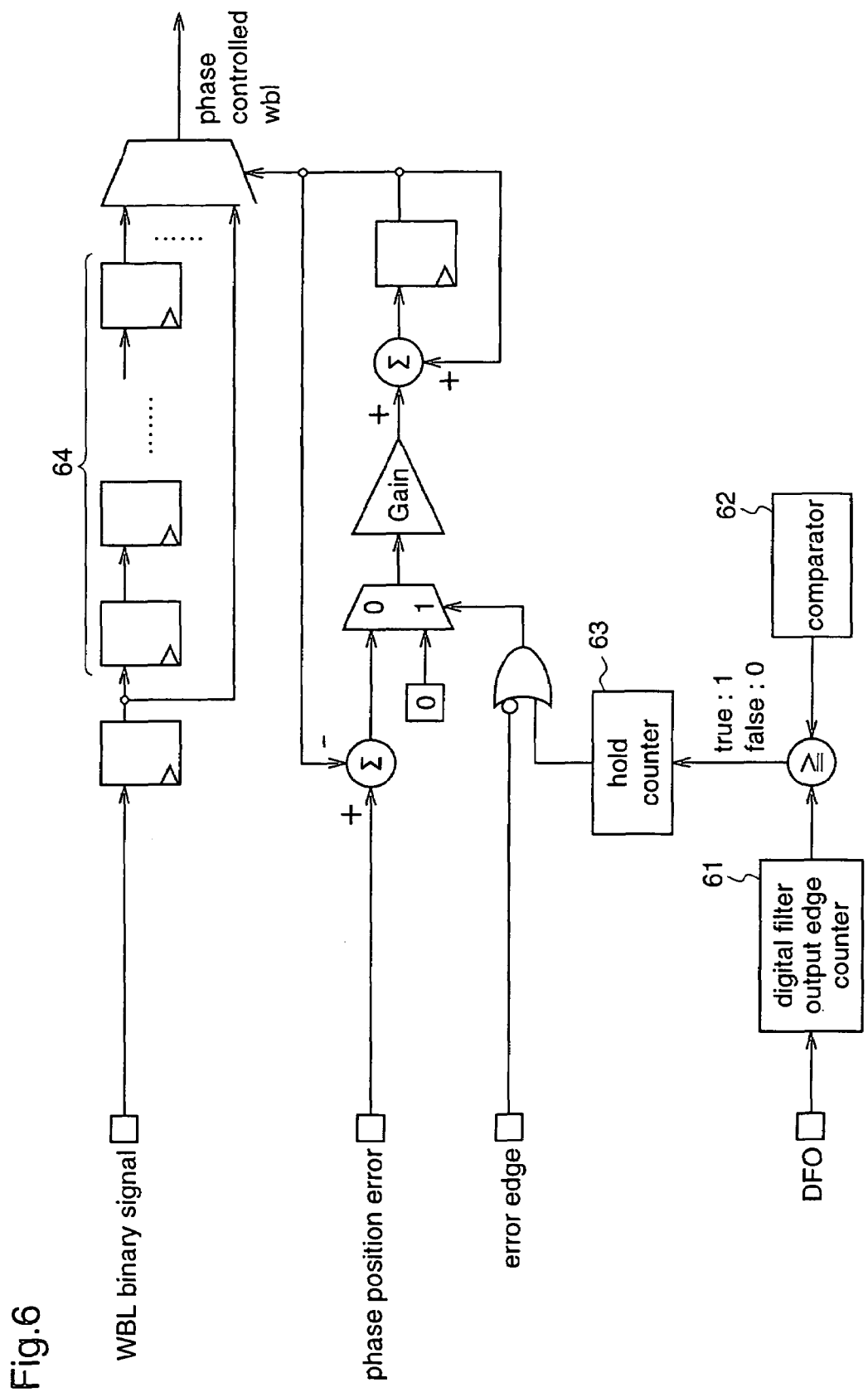
FIG. 6 is a diagram illustrating a construction of a phase control circuit according to the present invention.

FIG. 6 is a diagram illustrating a construction of the phase control circuit 107 according to the present invention.

As shown in FIG. 6, the smoothed WBL binary signal outputted from the WBL binarization circuit 105 and the WBL binary signal waveform outputted from the digital filter 111 are inputted to the phase control circuit 107. In addition, an error edge and a phase position error are supplied by arithmetic with a PC or the like, to the phase control circuit 107.

As the smoothed WBL binary signal outputted from the WBL binarization circuit 105 and the WBL binary signal waveform outputted from the digital filter 111 are not in phase, the phase control circuit 107 performs phase control. The phase control circuit 107 calculates a difference in phase between the smoothed WBL binary signal and the WBL binary signal waveform that has passed through the digital filter 111, and controls the phase by delaying the WBL binary signal by using registers. More specifically, a digital filter output edge counter 61 initially counts the number of edges, and the count value is compared with a comparison value that is previously set in the comparator 62. When a predetermined condition is not met, the circuit is held by a hold counter 63, whereas when the predetermined condition is met, data is outputted from a delay circuit 64 that consists of a predetermined number of register stages, so as to perform the phase control.

The phase control circuit 107 as shown in FIG. 6 controls the phase difference by using the delay circuit 64. Since the circuit is digitally configured, the phase difference can be corrected by executing the counter processing by using clock delay information that has been previously obtained. When the counter process is executed in this way, the construction of the delay circuit 64 in the phase control circuit as shown in FIG. 6 can be simplified, whereby the circuit scale can be reduced.

As described above, according to the wobble signal processing apparatus of the first embodiment, the address detection circuit 104 is constituted by the digital filter 109 and the PRML circuit 110, and the waveform shaping circuit is constituted by the digital filter. Further, and further the ADIP signal detection process and the clock signal generation process are implemented by the digital system. As a result, whereby the circuit scale, the parameter variations, and the power consumption can be reduced, and the possibility of defective products that may occur at the manufacturing steps can be decreased.

Second Embodiment

A wobble signal processing apparatus according to a second embodiment of the present invention will now be described.

Figure 8:
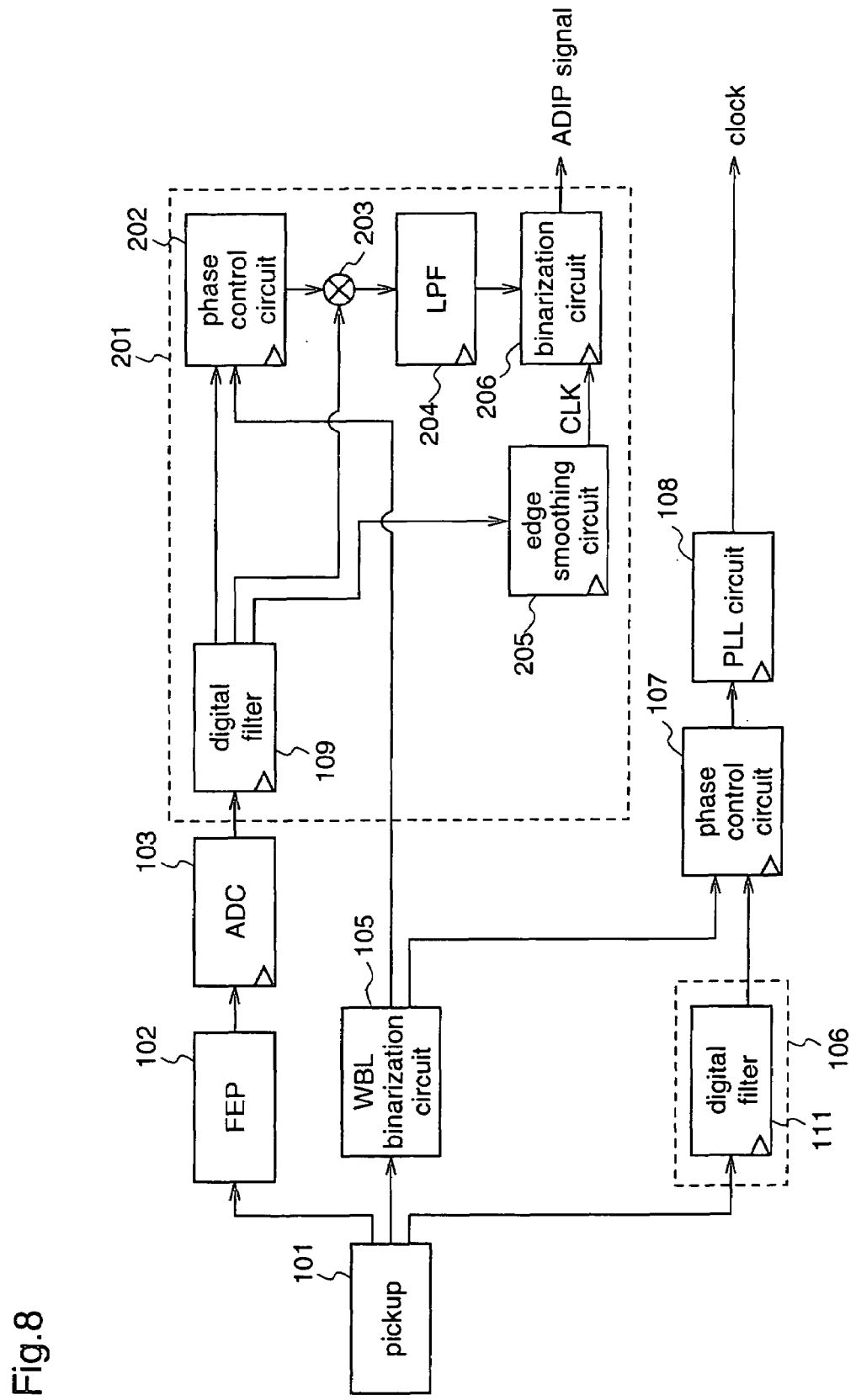
FIG. 8 is a block diagram illustrating a construction of a wobble signal processing apparatus according to a second embodiment of the present invention.

FIG. 8 is a block diagram illustrating a construction of the wobble signal processing apparatus according to the second embodiment. In FIG. 8, the wobble signal processing apparatus according to the second embodiment comprises a pickup 101, a PEP 102, an ADC 103, an address detection circuit 201, a WBL binarization circuit 105, a waveform shaping circuit 106, a phase control circuit 107, and a PLL circuit 108.

The wobble signal processing apparatus of the second embodiment is different from the above-mentioned wobble signal processing apparatus of the first embodiment in the construction of the address detection circuit 201, and the same components as those in the wobble signal processing apparatus of the first embodiment are denoted by the same reference numerals.

The address detection circuit 201 comprises a digital filter 109, a phase control circuit 202, a multiplier 203, a LPF 204, an edge smoothing circuit 205, and a binarization circuit 206. The digital filter 109 is a LPF that is the same as the digital filter 109 described in the first embodiment and implements the IIR digital system.

The phase control circuit 202 controls the phase of the WBL binary signal outputted from the WBL binarization circuit 105 with reference to the WBL binary signal waveform outputted from the digital filter 109, and outputs a phase controlled signal.

The multiplier 203 multiplies the output signal from the digital filter 109 by the phase controlled signal obtained by the phase control circuit 202, and outputs the result of the multiplication to the LPF 204.

The LPF 204 is a LPF that has the same construction as the digital filter 109 and implements the IIR digital system. Further, the LPF 204 attenuates the signal outputted from the multiplier 203 by cutting off the signal that is higher than the cutoff frequency, and outputs the signal that is lower than the cutoff frequency to the binarization circuit 206.

The edge smoothing circuit 205 generates a clock for outputting an ADIP signal by smoothing edges of the signal that is obtained by binarizing the digital filter output. When the digital filter output is binarized, a phase delay corresponding to the digital filter output occurs, and there arises a need for the edge smoothing circuit 205 to make the delayed signal in phase with the edges that have been smoothed by the WBL binarization circuit 105.

The binarization circuit 206 binarizes the signal outputted from the LPF 204 in accordance with the clock outputted from the edge smoothing circuit 205, and generates an ADIP signal.

Next, the operation of the wobble signal processing apparatus according to the second embodiment will be described. The wobble signal processing apparatus of the second embodiment operates in accordance with a sync clock that is inputted from the PLL circuit 108 to the respective circuits, and the clock is adaptively changed according to the angular velocity of the disc. Here, clocks such as WBLPLLOK, WCLK, CLKTCH, CLKSYS are employed as the sync clock.

Hereinafter, the ADIP detection process performed by the FEP 102, the ADC 103, and the address detection circuit 201 in the wobble signal processing apparatus according to the second embodiment will be described.

FIGS. 9(a) to 9(g) are waveform diagrams for explaining the ADIP signal detection process performed by the wobble signal processing apparatus according to the second embodiment.

Figure 9:
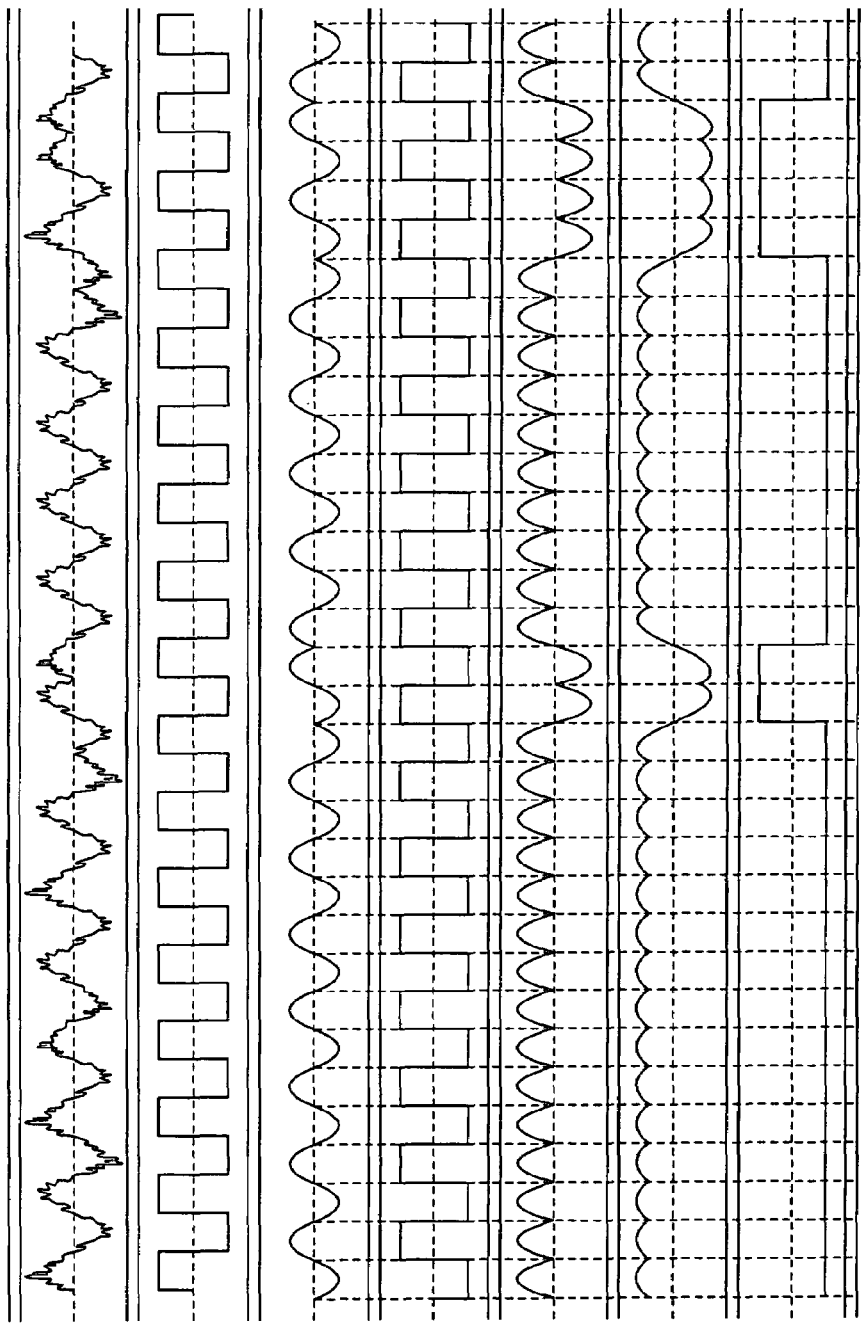
FIGS. 9(a) to 9(g) are waveform diagrams for explaining an ADIP signal detection process performed by the wobble signal processing apparatus according to the second embodiment.

FIG. 9(a) shows an example of a WBL signal that is read by the pickup 101. This WBL signal is subjected to band limitation and gain control by the FEP 102, is converted into a digital signal by the ADC 103, and then is inputted to the digital filter 109. This input signal is filtered by the digital filter 109, and a digital filter output signal as shown in FIG. 9(c) is outputted.

The phase control circuit 202 controls the phase of the WBL binary signal (FIG. 9(b)) outputted from the binarization circuit 105 with reference to the digital filter output signal shown in FIG. 9(c), and outputs a phase controlled signal to the multiplier 203.

Then, the multiplier 203 multiplies the digital filter output signal (FIG. 9(c)) outputted from the digital filter 109 by the phase controlled signal (FIG. 9(d)) outputted from the phase control circuit 202, and outputs a multiplier output signal as shown in FIG. 9(e) to the LPF 204.

The LPF 204 filters the multiplier output signal, and generates a LPF output signal as shown in FIG. 9(f). The LPF output signal is inputted to the binarization circuit 206 and is binarized so as to be in phase with the clock that is generated by the edge smoothing circuit 205, resulting in an ADIP signal as shown in FIG. 9(g).

Here, the clock signal generation processing performed by the WBL binarization circuit 105, the waveform shaping circuit 106, the phase control circuit 107, and the PLL circuit 108 of the wobble signal processing apparatus according to the second embodiment is the same as that in the wobble signal processing apparatus according to the first embodiment.

As described above, according to the wobble signal processing apparatus of the second embodiment, the address detection circuit 201 is constituted by the digital filter 109, the phase control circuit 202, the LPF 204, the edge smoothing circuit 205, and the binarization circuit 206, and the waveform shaping circuit 106 is constituted by the digital filter 111. Further, the ADIP signal detection process and the clock signal generation process are implemented a digital system. Therefore, the circuit scale, the parameter variations, and the power consumption can be reduced, and the possibility of defective products which may occur at the manufacturing steps can be decreased.

Here, the wobble signal processing apparatus according to the second embodiment is provided with the phase control circuit 202 and the phase control circuit 107 separately as shown in FIG. 8. However, because the phase control circuit 202 has the same construction as that of the phase control circuit 107 described in the first embodiment, when the circuit is actually designed, the wobble signal processing apparatus according to the second embodiment can be implemented with one phase control circuit.

Third Embodiment

A wobble signal processing apparatus according to a third embodiment of the present invention will now be described.

Figure 10:
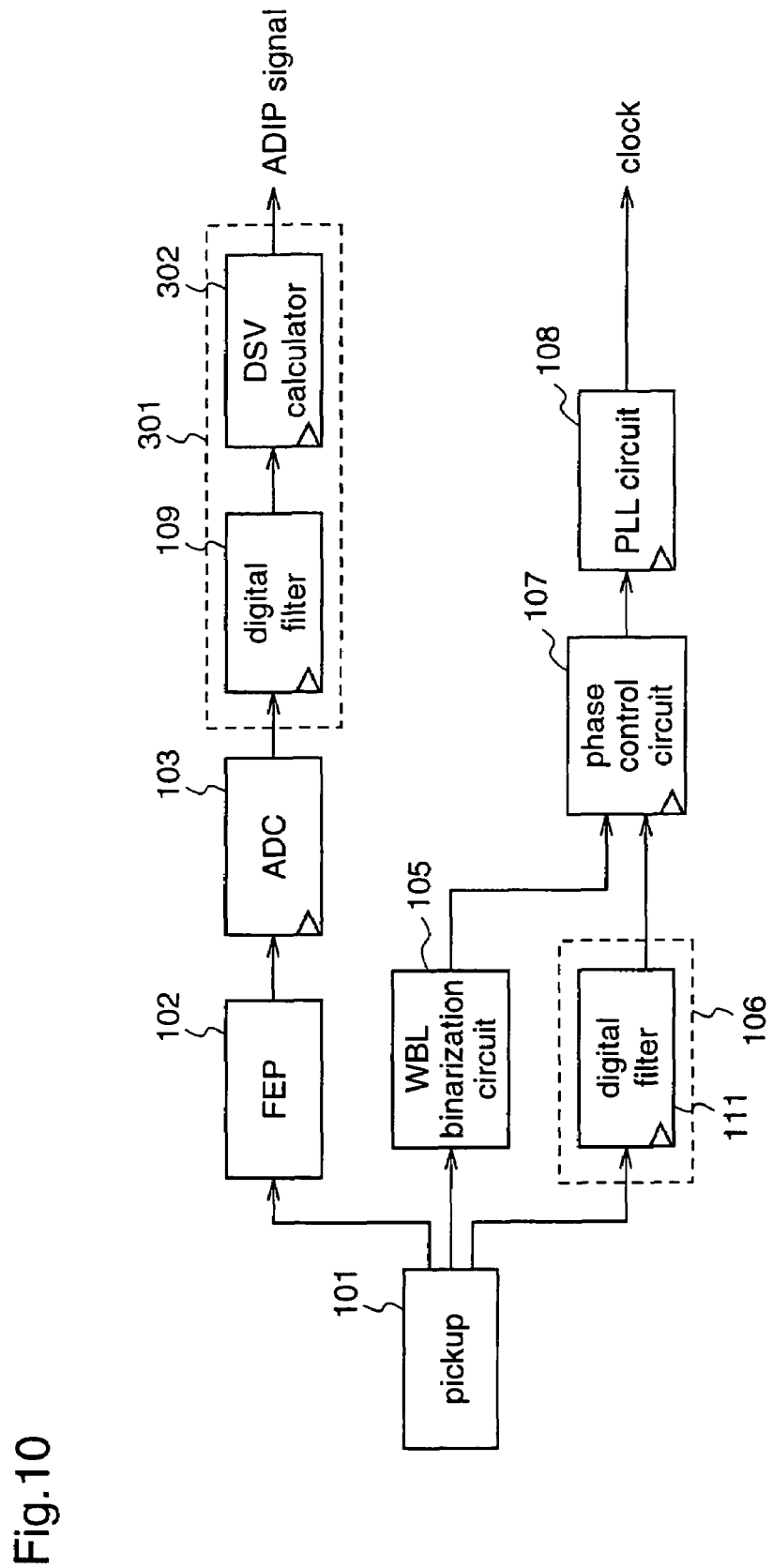
FIG. 10 is a block diagram illustrating a construction of a wobble signal processing apparatus according to a third embodiment of the present invention.

FIG. 10 is a block diagram illustrating a construction of a wobble signal processing apparatus according to the third embodiment of the present invention. In FIG. 10, the wobble signal processing apparatus comprises a pickup 101, a FEP 102, an ADC 103, an address detection circuit 301, a WBL binarization circuit 105, a waveform shaping circuit 106, a phase control circuit 107, and a PLL circuit 108.

The wobble signal processing apparatus according to the third embodiment is different from the wobble signal processing apparatus of the first embodiment in the construction of the address detection circuit 301, and the same components as those in the wobble signal processing apparatus of the first embodiment are denoted by the same reference numerals.

The address detection circuit 301 is constituted by a digital filter 109 and a DSV (Digital Sum Value) calculator 302. The digital filter 109 is an IIR digital LPF that is the same as the digital filter 109 which has been described in the first embodiment.

The DSV calculator 302 digitally processes the output from the digital filter 109 by dividing a rectangular wave with a threshold value, and detects an ADIP signal.

Next, the operation of the wobble signal processing apparatus according to the third embodiment will be described. Here, the wobble signal processing apparatus of the third embodiment operates in accordance with a sync clock that is inputted from the PLL circuit 108 to the respective circuits. The clock is adaptively changed according to the angular velocity of the disc. Clocks such as WBLPLLOK, WCLK, CLKTCH, CLKSYS are employed as the sync clock.

Hereinafter, an ADIP detection process in the wobble signal processing apparatus according to the third embodiment will be described. The operations of the pickup 101, the FEP 102, and the ADC 103 are the same as those in the wobble signal processing apparatus according to the first or second embodiment.

A WBL signal is converted into a digital signal by means of the pickup 101, the FEP 102 and the ADC 103, and the digital signal is inputted to the address detection circuit 301. In the address detection circuit 301, the signal is digitally processed and an ADIP signal is detected.

Hereinafter, the operation of the address detection circuit 301 will be described in more detail.

In the address detection circuit 301, the inputted WBL signal is initially filtered by the digital filter 109, and the output of the digital filter is inputted to the DSV calculator 302.

The DSV calculator 302 that has received the digital filter output digitally processes the output by dividing a rectangular wave of the digital filter output with a threshold value, and detects an ADIP signal. More specifically, the output of the digital filter 109 is converted into −1, 0, and +0, and the numbers of −1 and +1 are counted. When the count of +1 or the count of −1 reaches a predetermined threshold value, this is outputted as an ADIP signal.

Here, the clock signal generation process performed by the WBL binarization circuit 105, the waveform shaping circuit 106, the phase control circuit 107, and the PLL circuit 108 in the wobble signal processing apparatus according to the third embodiment is the same as that in the wobble signal processing apparatus according to the first embodiment.

As described above, according to the wobble signal processing apparatus of the third embodiment, the address detection circuit 301 is constituted by the digital filter 109 and the DSV calculator 302, and the waveform shaping circuit 106 is constituted by the digital filter 111. Further, the ADIP signal detection process and the clock signal generation process are implemented digitally. As a result, the circuit scale, the parameter variations, and the power consumption can be reduced, and the possibility of defective products that may occur at the manufacturing steps can be decreased.

Figure 11:
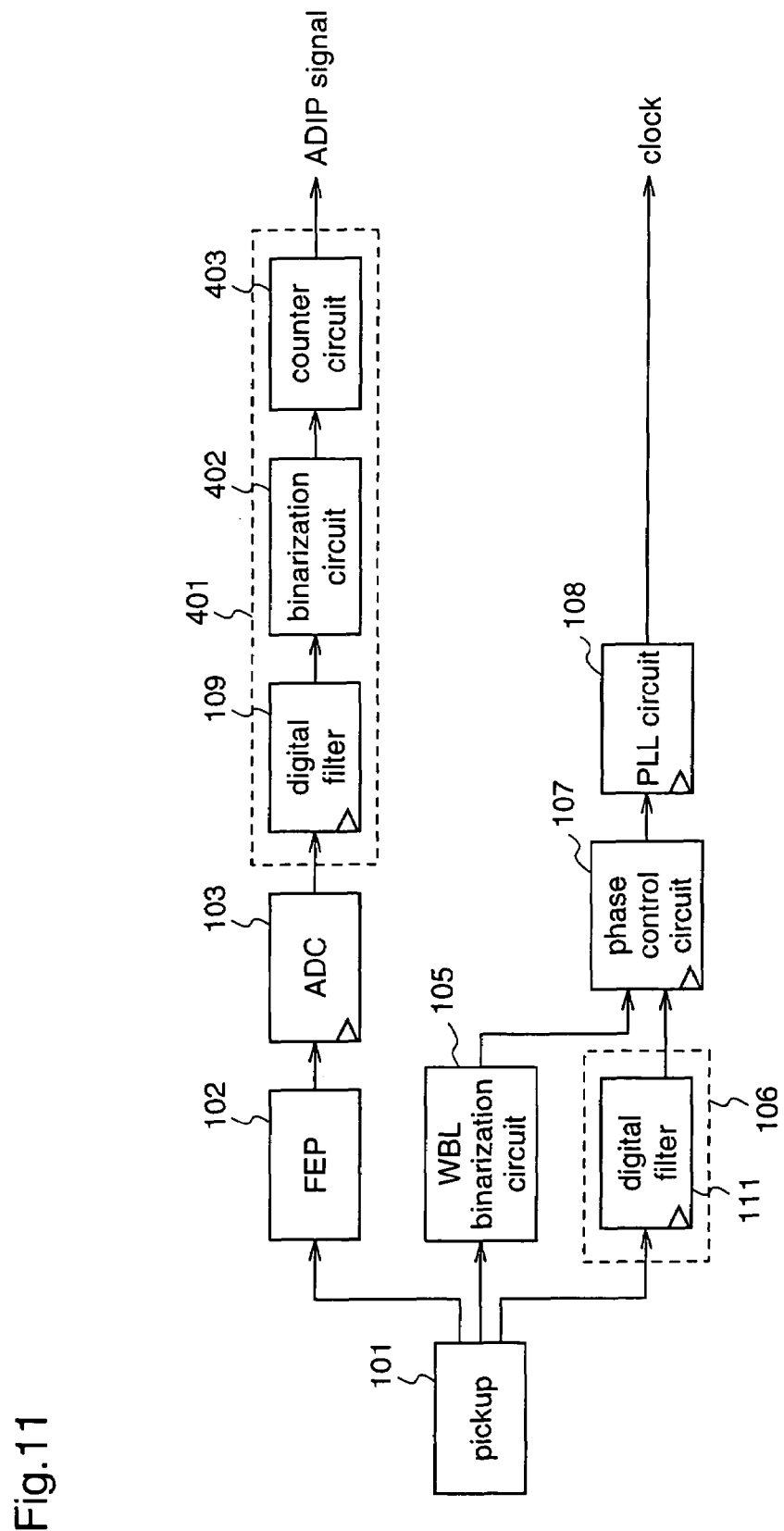
FIG. 11 is a block diagram illustrating another construction of the wobble signal processing apparatus according to the third embodiment of the present invention.

The wobble signal processing apparatus according to the third embodiment is provided with the DSV calculator 302. However, the DSV calculator 302 can be replaced with a binarization circuit 402 and a counter circuit 403 as shown in FIG. 11. In this case, a binary signal that is outputted from the binarization circuit 402 is inputted to the counter circuit 403, and the counter circuit 403 counts +1 or −1. When the count of +1 or −1 reaches a predetermined threshold value, this is outputted as an ADIP signal.

What is claimed is:

1. A wobble signal processing apparatus comprising:
   a pickup for reading information recorded on an optical disc medium on/from which data can be recorded/reproduced, and outputting a wobble binary signal, a wobble signal and a RF signal;
   a Wobble (WBL) binarization circuit for smoothing edges of the wobble binary signal outputted from said pickup;
   a Front End Processor (FEP) for performing band limitation and gain control to the wobble signal outputted from said pickup;
   an Analog-to-Digital Converter (ADC) for converting the wobble signal outputted from said FEP into a digital signal;
   an address detection circuit for detecting an Address In Pre-Groove (ADIP) signal as address information of the data based on the digital signal outputted from said ADC;
   a waveform shaping circuit for generating a wobble binary signal waveform based on the RF signal outputted from said pickup;
   a phase control circuit for controlling the phase of the wobble binary signal outputted from said WBL binarization circuit with reference to the wobble binary signal waveform generated by said waveform shaping circuit, and outputting phase controlled data; and
   a Phase Locked Loop (PLL) circuit, which is connected to said phase control circuit, for generating a sync clock based on the phase controlled data outputted from said phase control circuit;
   wherein said address detection circuit and said waveform shaping circuit are digitally configured;
   wherein said address detection circuit comprises:
      a digital filter for filtering the digital signal outputted from the said ADC; and
      a Partial Response Maximum Likelihood (PRML) circuit for correcting errors in the signal outputted from said digital filter, and detecting the ADIP signal by using the corrected signal; and
   wherein a PRML system that is implemented by said PRML circuit is a PR(a,b) system.

2. The wobble signal processing apparatus as defined in claim 1, wherein parameter values in the PR(a,b) system have a relationship of a=b.

3. A wobble signal processing apparatus comprising:
   a pickup for reading information recorded on an optical disc medium on/from which data can be recorded/reproduced, and outputting a wobble binary signal, a wobble signal and a RF signal;
   a Wobble (WBL) binarization circuit for smoothing edges of the wobble binary signal outputted from said pickup;
   a Front End Processor (FEP) for performing band limitation and gain control to the wobble signal outputted from said pickup;
   an Analog-to-Digital Converter (ADC) for converting the wobble signal outputted from said FEP into a digital signal;
   an address detection circuit for detecting an Address In Pre-Groove (ADIP) signal as address information of the data based on the digital signal outputted from said ADC;
   a waveform shaping circuit for generating a wobble binary signal waveform based on the RF signal outputted from said pickup;
   a phase control circuit for controlling the phase of the wobble binary signal outputted from said WBL binarization circuit with reference to the wobble binary signal waveform generated by said waveform shaping circuit, and outputting phase controlled data; and
   a Phase Locked Loop (PLL) circuit, which is connected to said phase control circuit, for generating a sync clock based on the phase controlled data outputted from said phase control circuit;
   said address detection circuit and said waveform shaping circuit are digitally configured;
   wherein said address detection circuit comprises:
      a digital filter for filtering the digital signal outputted from said ADC; and
      a Partial Response Maximum Likelihood (PRML) circuit for correcting errors in the signal outputted from said digital filter, and detecting the ADIP signal by using the corrected signal; and
   wherein said PRML circuit is operable to switch a sampling method between a peak sampling method and an offset sampling method.

4. The wobble signal processing apparatus as defined in claim 3,
   wherein said PRML circuit is operable to perform the sampling in a cycle of 8T.

5. A wobble signal processing apparatus comprising:
   a pickup for reading information recorded on an optical disc medium on/from which data can be recorded/reproduced, and outputting a wobble binary signal, a wobble signal and a RF signal;
   a Wobble (WBL) binarization circuit for smoothing edges of the wobble binary signal outputted from said pickup;
   a Front End Processor (FEP) for performing band limitation and gain control to the wobble signal outputted from said pickup;
   an Analog-to-Digital Converter (ADC) for converting the wobble signal outputted from said FEP into a digital signal;
   an address detection circuit for detecting an Address In Pre-Groove (ADIP) signal as address information of the data based on the digital signal outputted from said ADC;

a waveform shaping circuit for generating a wobble binary signal waveform based on the RF signal outputted from said pickup;

a phase control circuit for controlling the phase of the wobble binary signal outputted from said WBL binarization circuit with reference to the wobble binary signal waveform generated by said waveform shaping circuit, and outputting phase controlled data; and a Phase Locked Loop (PLL) circuit, which is connected to said phase control circuit, for generating a sync clock based on the phase controlled data outputted from said phase control circuit;

wherein said address detection circuit and said waveform shaping circuit are digitally configured;

wherein said address detection circuit comprises:
- a digital filter for filtering the digital signal outputted from said ADC; and
- a Partial Response Maximum Likelihood (PRML) circuit for correcting errors in the signal outputted from said digital filter, and detecting the ADIP signal by using the corrected signal; and wherein said PRML circuit is operable to perform a standardized Euclidean distance algorithm in a computing circuit of a Viterbi decoder by the PRML system.

6. A wobble signal processing apparatus comprising:

a pickup for reading information recorded on an optical disc medium on/from which data can be recorded/reproduced, and outputting a wobble binary signal, a wobble signal and a RF signal;

a Wobble (WBL) binarization circuit for smoothing edges of the wobble binary signal outputted from said pickup;

a Front End Processor (FEP) for performing band limitation and gain control to the wobble signal outputted from said pickup;

an Analog-to-Digital Converter (ADC) for converting the wobble signal outputted from said FEP into a digital signal;

an address detection circuit for detecting an Address In Pre-Groove (ADIP) signal as address information of the data based on the digital signal outputted from said ADC;

a waveform shaping circuit for generating a wobble binary signal waveform based on the RF signal outputted from said pickup;

a first phase control circuit for controlling the phase of the wobble binary signal outputted from said WBL binarization circuit with reference to the wobble binary signal waveform generated by said waveform shaping circuit, and outputting phase controlled data; and a Phase Locked Loop (PLL) circuit, which is connected to said first phase control circuit, for generating a sync clock based on the phase controlled data outputted from said first phase control circuit;

wherein said address detection circuit and said waveform shaping circuit are digitally configured; and wherein said address detection circuit comprises:
- a first digital filter for filtering the digital signal outputted from said ADC;
- a second phase control circuit for controlling the phase of the wobble binary signal outputted from said WBL binarization circuit with reference to the signal outputted from said first digital filter, and outputting a phase controlled signal;
- a multiplier for multiplying the signal outputted from said first digital filter by the phase controlled signal outputted from said second phase control circuit;
- a second digital filter for filtering an output from said multiplier;
- an edge smoothing circuit for binarizing the signal outputted from said first digital filter, and smoothing edges of the binarized signal, so as to generate a clock for outputting the ADIP signal; and
- a binarization circuit for binarizing the signal outputted from said second digital filter in accordance with the clock outputted from said edge smoothing circuit, and outputting the ADIP signal.

7. A wobble signal processing apparatus comprising:

a pickup for reading information recorded on an optical disc medium on/from which data can be recorded/reproduced, and outputting a wobble binary signal, a wobble signal and a RF signal;

a Wobble (WBL) binarization circuit for smoothing edges of the wobble binary signal outputted from said pickup;

a Front End Processor (FEP) for performing band limitation and gain control to the wobble signal outputted from said pickup;

an Analog-to-Digital Converter (ADC) for converting the wobble signal outputted from said FEP into a digital signal;

an address detection circuit for detecting an Address In Pre-Groove (ADIP) signal as address information of the data based on the digital signal outputted from said ADC;

a waveform shaping circuit for generating a wobble binary signal waveform based on the RF signal outputted from said pickup;

a phase control circuit for controlling the phase of the wobble binary signal outputted from said WBL binarization circuit with reference to the wobble binary signal waveform generated by said waveform shaping circuit, and outputting phase controlled data; and a Phase Locked Loop (PLL) circuit, which is connected to said phase control circuit, for generating a sync clock based on the phase controlled data outputted from said phase control circuit;

wherein said address detection circuit and said waveform shaping circuit are digitally configured;

wherein said waveform shaping circuit includes a digital filter for generating the wobble binary signal waveform based on the RF signal outputted from said pickup; and wherein said phase control circuit is operable to obtain a phase difference between the wobble binary signal and the wobble binary signal waveform that has passed through said digital filter, and control the phase by delaying the wobble binary signal.

8. The wobble signal processing apparatus as defined in claim 7, wherein said phase control circuit is operable to correct a phase shift by performing counter processing to clock delay information previously obtained.

9. A wobble signal processing apparatus comprising:

a pickup for reading information recorded on an optical disc medium on/from which data can be recorded/reproduced, and outputting a wobble binary signal, a wobble signal and a RF signal;

a Wobble (WBL) binarization circuit for smoothing edges of the wobble binary signal outputted from said pickup;

a Front End Processor (FEP) for performing band limitation and gain control to the wobble signal outputted from said pickup;

an Analog-to-Digital Converter (ADC) for converting the wobble signal outputted from said FEP into a digital signal;

an address detection circuit for detecting an Address In Pre-Groove (ADIP) signal as address information of the data based on the digital signal outputted from said ADC;

a waveform shaping circuit for generating a wobble binary signal waveform based on the RF signal outputted from said pickup;

a phase control circuit for controlling the phase of the wobble binary signal outputted from said WBL binarization circuit with reference to the wobble binary signal waveform generated by said waveform shaping circuit, and outputting phase controlled data; and a Phase Locked Loop (PLL) circuit, which is connected to said phase control circuit, for generating a sync clock based on the phase controlled data outputted from said phase control circuit;

wherein said address detection circuit and said waveform shaping circuit are digitally configured; and wherein said address detection circuit comprises:
 a digital filter for filtering the digital signal outputted from said ADC; and
 a Digital Sum Value (DSV) calculator for digitally processing the output from said digital filter by dividing the output from said digital filter with a predetermined threshold value, so as to detect the ADIP signal.

10. A wobble signal processing apparatus comprising:

a pickup for reading information recorded on an optical disc medium on/from which data can be recorded/reproduced, and outputting a wobble binary signal, a wobble signal and a RF signal;

a Wobble (WBL) binarization circuit for smoothing edges of the wobble binary signal outputted from said pickup;

a Front End Processor (FEP) for performing band limitation and gain control to the wobble signal outputted from said pickup;

an Analog-to-Digital Converter (ADC) for converting the wobble signal outputted from said FEP into a digital signal;

an address detection circuit for detecting an Address In Pre-Groove (ADIP) signal as address information of the data based on the digital signal outputted from said ADC;

a waveform shaping circuit for generating a wobble binary signal waveform based on the RF signal outputted from said pickup;

a phase control circuit for controlling the phase of the wobble binary signal outputted from said WBL binarization circuit with reference to the wobble binary signal waveform generated by said waveform shaping circuit, and outputting phase controlled data; and a Phase Locked Loop (PLL) circuit, which is connected to said phase control circuit, for generating a sync clock based on the phase controlled data outputted from said phase control circuit;

wherein said address detection circuit and said waveform shaping circuit are digitally configured;

wherein said address detection circuit comprises:
 a digital filter for filtering the digital signal outputted from said ADC;
 a binarization circuit for binarizing the output from said digital filter; and
 a counter circuit for counting a number of +1 and a number −1 in the signal outputted from said binarization circuit; and wherein said address detection circuit is operable to detect the ADIP signal based on the count values of said counter circuit.

11. The wobble signal processing apparatus as defined in claim 7, wherein said ADC has a 7-bit resolution.

12. A wobble signal processing apparatus comprising:

a pickup for reading information recorded on an optical disc medium on/from which data can be recorded/reproduced, and outputting a wobble binary signal, a wobble signal and a RF signal;

a Wobble (WBL) binarization circuit for smoothing edges of the wobble binary signal outputted from said pickup;

a Front End Processor (FEP) for performing band limitation and gain control to the wobble signal outputted from said pickup;

an Analog-to-Digital Converter (ADC) for converting the wobble signal outputted from said FEP into a digital signal;

an address detection circuit for detecting an Address In Pre-Groove (ADIP) signal as address information of the data based on the digital signal outputted from said ADC;

a waveform shaping circuit for generating a wobble binary signal waveform based on the RF signal outputted from said pickup;

a phase control circuit for controlling the phase of the wobble binary signal outputted from said WBL binarization circuit with reference to the wobble binary signal waveform generated by said waveform shaping circuit, and outputting phase controlled data; and a Phase Locked Loop (PLL) circuit, which is connected to said phase control circuit, for generating a sync clock based on the phase controlled data outputted from said phase control circuit;

wherein said address detection circuit and said waveform shaping circuit are digitally configured;

wherein said FEP further includes an Auto Gain Control (AGC) circuit for performing automatic amplitude control when an amplitude of a section of the ADIP signal is decreased or increased due to crosstalk in the optical disc medium.

13. A wobble signal processing apparatus comprising:

a pickup for reading information recorded on an optical disc medium on/from which data can be recorded/reproduced, and outputting a wobble binary signal, a wobble signal and a RF signal;

a Wobble (WBL) binarization circuit for smoothing edges of the wobble binary signal outputted from said pickup;

a Front End Processor (FEP) for performing band limitation and gain control to the wobble signal outputted from said pickup;

an Analog-to-Digital Converter (ADC) for converting the wobble signal outputted from said FEP into a digital signal;

an address detection circuit for detecting an Address In Pre-Groove (ADIP) signal as address information of the data based on the digital signal outputted from said ADC;

a waveform shaping circuit for generating a wobble binary signal waveform based on the RF signal outputted from said pickup;

a phase control circuit for controlling the phase of the wobble binary signal outputted from said WBL binarization circuit with reference to the wobble binary signal waveform generated by said waveform shaping circuit, and outputting phase controlled data; and a Phase Locked Loop (PLL) circuit, which is connected to said phase control circuit, for generating a sync clock based on the phase controlled data outputted from said phase control circuit;

wherein said address detection circuit and said waveform shaping circuit are digitally configured; and wherein said pickup further includes an aperture ratio decision unit for deciding a degree of distortion of a waveform that is read from the optical disc medium, and said pickup is operable to control a diameter of a beam spot of a pickup laser based on the decided degree of distortion of the waveform, so as to control the degree of signal component extraction.

14. The wobble signal processing apparatus as defined in claim 7, wherein:

said apparatus operates in accordance with the sync clock generated by said PLL circuit; and the sync clock is adaptively changed according to an angular velocity of the optical disc medium.

15. The wobble signal processing apparatus as defined in claim 6, wherein:

said waveform shaping circuit includes a digital filter for generating the wobble binary signal waveform based on the RF signal outputted from said pickup; and said phase control circuit is operable to obtain a phase difference between the wobble binary signal and the wobble binary signal waveform that has passed through said digital filter, and control the phase by delaying the wobble binary signal.

16. The wobble signal processing apparatus as defined in claim 15, wherein said phase control circuit is operable to correct a phase shift by performing counter processing to clock delay information previously obtained.

* * * * *